Aug. 14, 1923.

B. S. HARRINGTON 1,464,676

MEASURING AND FILLING MACHINE

Original Filed Oct. 28, 1920    2 Sheets-Sheet 1

Witness:
R. Burkhardt

Inventor:
B. S. Harrington,
By Cromwell, Greist & Warden
Attys

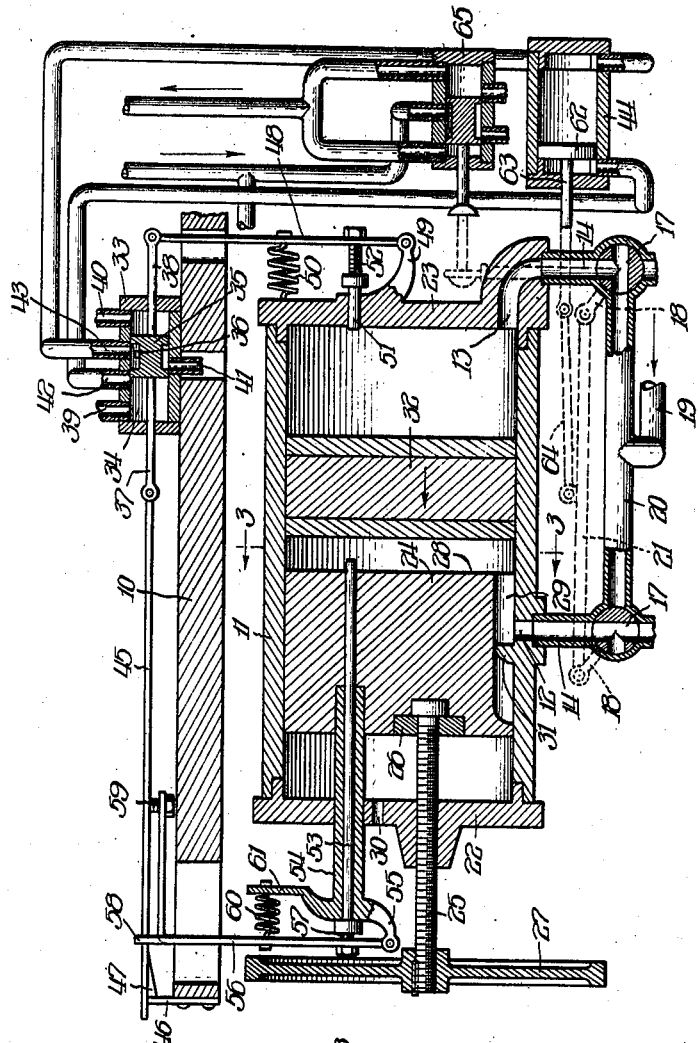

Patented Aug. 14, 1923.

1,464,676

UNITED STATES PATENT OFFICE.

BERTIE S. HARRINGTON, OF FORT WORTH, TEXAS.

MEASURING AND FILLING MACHINE.

Original application filed October 28, 1920, Serial No. 420,187. Divided and this application filed October 13, 1922. Serial No. 594,236.

*To all whom it may concern:*

Be it known that I, BERTIE S. HARRINGTON, a citizen of the United States, residing at Fort Worth, in the county of Tarrant and State of Texas, have invented certain new and useful Improvements in Measuring and Filling Machines, of which the following is a specification.

The present invention relates in general to dispensing mechanisms, and is particularly concerned with the measuring mechanism of a measuring, filling, and receptacle-handling machine adapted for use with substances in a fluid or semi-fluid state, such as oils, lard, and the like; this application being a division of my co-pending application, Serial No. 420,187, which was filed October 28, 1920.

The principal purpose of this invention is to provide, in a machine of the type above mentioned, improved automatically-controlled measuring mechanism which is continuous rather than intermittent in its action, and which has incorporated therein means whereby the equal unitary quantities of substance being dispensed may be either greatly or minutely varied without stopping or in any way interfering with the operation of the mechanism.

While the foregoing statement is indicative in a general way of the nature of the invention, other objects and advantageous features not specifically referred to in this disclosure will be obvious upon a full understanding of the construction and operation of the mechanism as set forth in the following description and accompanying drawings wherein is delineated a preferred embodiment of the invention. It will be understood, however, that this particular embodiment is chosen primarily for the purpose of exemplification, and is not intended to restrict in any way the spirit of the invention or to limit unnecessarily the scope of the appended claims.

In the drawings—

Fig. 2 is a vertical longitudinal section through the measuring mechanism; and

Fig. 3 is a vertical transverse section taken on the line 3—3 of Fig. 2.

Figure 1:
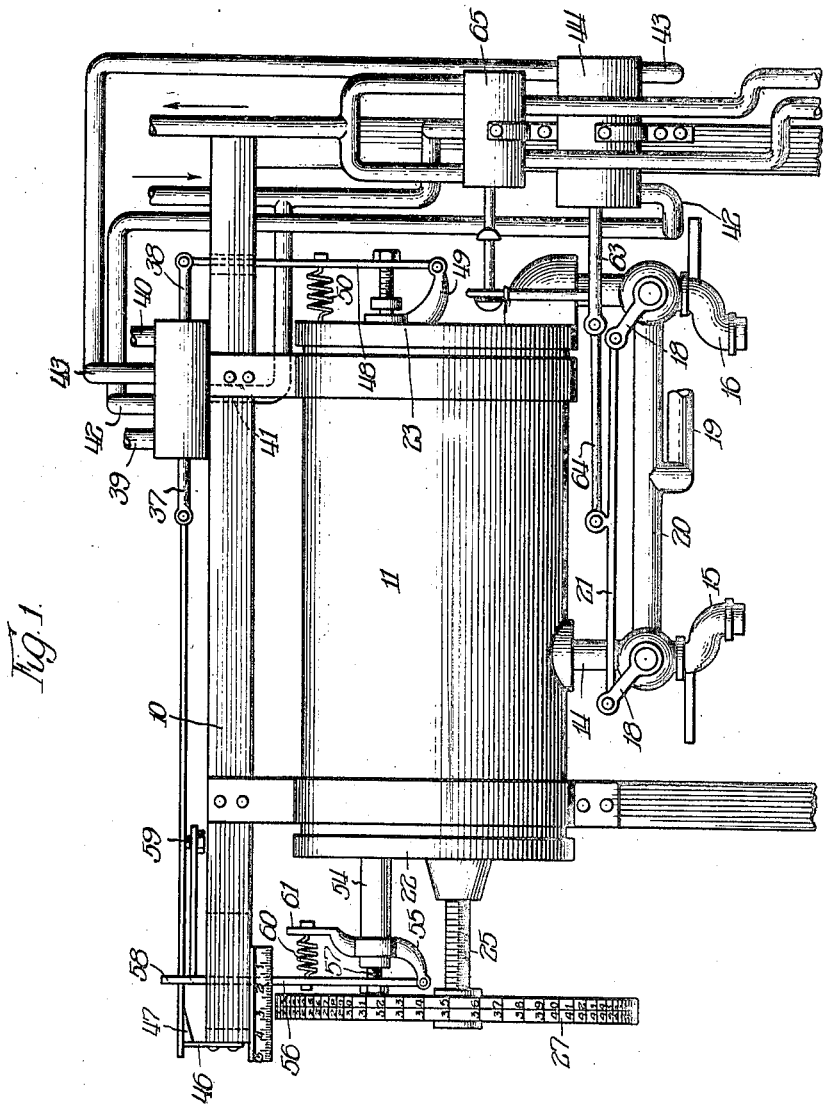
Fig. 1 is a front elevation of the measuring mechanism.

Referring now with more detail to the drawings, it will be observed that the subject-matter of this invention, namely the measuring mechanism and the associated controlling and actuating means therefor, are supported upon a vertically disposed frame work 10 which is preferably located above the table portion (not shown) of any approved receptacle-handling mechanism.

The so-called measuring mechanism consists primarily of a relatively large cylinder 11, which is provided in its bottom with two spaced ports 12 and 13, which open downwardly to pipes 14 which terminate in swivelled offset discharge nozzles 15 and 16 respectively. Disposed in each pipe 14 intermediate its discharge nozzle and the cylinder 11, is a three-way valve 17 which is rotatable on its horizontal axis by means of a short arm 18 fixedly secured to the valve stem.

A pipe 19 for supplying the fluid to be dispensed opens into a horizontal pipe 20 which terminates at either end in the casing of that one of the three-way valves 17 adjacent thereto; and each of said valves is so designed that, by operation thereof through movement of the levers 18, the ports 12 and 13 are alternatively put into open communication with the liquid supply and with the discharge nozzle. The upper ends of the levers 18 are connected by a horizontal link 21 in such a way that when the port 12 is in communication with its discharge nozzle, the port 13 is in communication with the liquid supplying pipe 19, and vice versa.

The port 12 opens into the cylinder 11 a spaced distance from one end 22 thereof, while the port 13 opens into said cylinder at its opposite end 23. A false head 24 fits snugly in the cylinder 11 above the port 12, and is adapted to be adjusted longitudinally in the bore of the same a limited distance in either direction. The means for adjusting said false head comprises a screw spindle 25 which is attached to one end of the false head and, although prevented from moving longitudinally with relation thereto, is permitted to rotate within the confines of its attaching plate 26. The spindle 25 projects horizontally through the cylinder head 22, and is in threaded engagement with the same. A hand wheel 27 is keyed to the outer extremity of the spindle 25, and, upon rotation of said wheel, the false head 24 may be made to move inwardly or outwardly in cylinder 11, thus varying the effective volume or capacity of said cylinder to which the fluid is admitted between the inner end 28 of the false adjustable head and the opposite fixed cylinder head proper.

A passage 29 is provided in the under side of the false head above the port 12 and extends from the inner end of said head to a point a little short of the length of the same. The port 12 is therefore at all times in communication with the interior of the cylinder 11 regardless of the position in which the false head may be adjusted.

That portion of the interior of the cylinder 11 between the false head 24 and the fixed cylinder head 22 is functionless, and a small aperture 30 may be bored in said cylinder end to relieve any vacuum or pressure set up therein by reason of the movement of the false head. The movement of the false head 24 is limited in an outward direction by contact of the same with the cylinder head 22, and in an inward direction by contact of the end of the passage 29 with a projecting and passage-filling lug 31 formed in the bottom of the cylinder 11 adjacent port 12.

A floating piston 32 also fits snugly within the bore of the cylinder 11 and reciprocates therein between the face 28 of the false head and the opposite fixed head 23 of said cylinder. The means for actuating said floating piston consists of the fluid being dispensed, which must be under pressure.

With the three-way valves in the position illustrated in Fig. 2, fluid under pressure will flow from the suply pipe 19 into the right end of the cylinder 11 through the port 13, forcing the piston to the left and causing the fluid occupying the cylinder on the opposite side of said piston to be expelled therefrom through the port 12 and its adjacent three-way valve and discharge nozzle. Upon coming in contact with the false head the movement of the piston is stopped and the flow from the left hand discharge nozzle ceases.

It will readily be seen that if the positions of the three-way valves 17 are now changed by rotating the same simultaneously 90° in a clockwise direction by means of the lever-connecting link 21, an equal quantity of fluid, which has meanwhile filled the right-hand end of the cylinder 11 in the process of moving the piston to the left, will now be discharged therefrom through the port 13 and its corresponding three-way valve and discharge nozzle.

A description of the means for automatically operating the three-way valves each time the free piston reaches either end of its travel, follows:

Mounted advantageously on the frame work 10 above the cylinder 11 is a small cylindrical valve casing 33 having a central bore 34 wherein is disposed a reciprocating valve plug 35 which is provided about its circumference with a relatively wide annular groove 36. Said valve plug is attached at both ends to axially aligned stems 37 and 38 which project through the ends of the valve casing and extend a short distance therebeyond.

Five ports 39 to 43, inclusive, with similarly numbered pipes are in communication with the bore 34 of the valve. The end ports 39 and 40 are exhaust air ports or vents, the lower center port 41 is a compressed air inlet, and the upper medial ports 42 and 43 communicate respectively with the left and right hand ends of an air motor 44 to be later described, which is positioned advantageously below and to the right of the cylinder 11 on one of the vertical beams of the frame work 10.

The stem 37 of the valve 35 has pivoted thereto at its outer extremity one end of a flat, horizontal bar 45, the opposite end of which bar rests upon the knife-like edge of a small vertical support 46 securely attached to the end of the cross-beam of the frame work 10. A small wedge-shaped catch 47 is secured to the under surface of the bar 45 adjacent the support 46 and, when the valve 35 has assumed the position shown in Fig. 2, the outer or abrupt face of said catch abuts the edge of the support 46 and prevents movement of the valve 35 to the left unless said catch is released from engagement with the support 46 by raising the bar 45 a sufficient distance to permit the catch to pass freely thereover.

The stem 38 of the valve 35 has pivoted thereto at its outer extremity the upper end of a vertically disposed rod 48. The lower end of said rod is pivoted to a bracket arm 49 extending outwardly a short distance from the cylinder head 23. A relatively strong spring 50 connects the medial portion of the rod 48 with the adjacent end of the cylinder 11 and, using the bracket arm 49 as a fulcrum, tends to shift the valve 35 to the left. The valve 35 is held stationary, however, due to the engagement of the catch 47 with the edge of the support 46.

A short distance above the bracket arm 49 in the cylinder head 23 is a reciprocating plunger or tappet 51 which extends a short distance inside of the cylinder 11 and is provided on its outer end with an enlarged head. An adjusting screw 52 is positioned in the rod 48 in axial alignment with said plunger and retains the same in its inward position when the valve 35 has shifted to the left hand end of its throw. When the said valve is in the position illustrated in the drawings however, the rod 48, acting through the adjusting screw 52, limits the outward movement of the tappet, as shown.

A second but elongated plunger or tappet 53 is positioned in the false head 24 in horizontal alignment with the tappet 51. The inner extremity of the tappet 53 likewise extends into the interior of the cylinder 11 a short distance. An elongated support 54 is fixedly secured to the outer face of the fase head 24, and extends outwardly through the cylinder end 22 to a point short of the hand wheel 27 where it is formed into a bracket arm 55. This support receives and supports throughout its length the elongated shank of the reciprocating tappet plunger 53.

A rod 56 is pivoted at its lower extremity to the bracket arm 55 and extends vertically to a point immediately below the previously described bar 45, at which point the rod 56 turns horizontally and extends a short distance to the right parallel to the bar 45. This end of the rod 56 contains an adjusting screw 57 which will contact with the under surface of the bar 45. At the point at which the rod 56 turns horizontally to the right, two short vertically extending fingers 58 are formed which extend on each side of the bar 45 to prevent lateral movement thereof and to vertically align the same with the point of the adjusting screw 57.

The rod 56 contains another adjusting screw 59 which is axially aligned with the tappet 53 and contacts with the enlarged head thereof. A spring 60 connects the medial portion of the rod 56 with an extension 61 of the bracket arm 55 and serves to retain the tappet 53 in its inward position and to prevent the adjusting screw 57 of the bar 56 from tripping the bar 45 upwardly unless the same is intentionally so actuated through the outward movement of said tappet.

It will now be seen that the floating piston 32, upon moving into contact with the end 23 of the cylinder 11, will move the tappet 51 outwardly and thus shift the valve 35 to the right against the action of the spring 50. Upon being so shifted the valve 36 is held against shifting to the left by the operation of the catch 47 previously described. Upon contacting with the inner end 28 of the false head 24, the piston will move the tappet 53 outwardly and will thus cause the rod 56 to trip the bar 45 upwardly, whereupon the valve 35 will be shifted to the left by the action of the expanded spring 50.

Due to the novel construction and arrangement of parts as above set forth, the valve 35 shifts its position each time the piston contacts with the head and tappet at either end of its stroke, regardless of the position to which the false head is adjusted.

Since it is desired that the three-way valves 17 be operated each time the piston reaches either end of its stroke in order that the ports 12 and 13 will be caused to reverse their functions as inlet and discharge ports and thus permit the measuring and discharging operations to be carried on in the reverse direction, the previously mentioned air motor 44, actuated by valve 35, is employed.

When the piston is moving to the left, as shown in Fig. 2, the valve 35 is in its right hand position in the casing 33, and the wide annular groove 36 thereof transmits compressed air or other pressure fluid from the port 41 to the port 43 and thus into the right hand end of the air motor 44. A piston 62 reciprocates therein and has its stem 63 connected by a link 64 to the link 21 which rotates the valves 17 simultaneously. Due to the force of the compressed air the piston 62 is held at the left hand end of its stroke, the air having been expelled from that end of the cylinder 44 through the pipe 42 into the bore 34 of the valve casing 33 from where it escapes through the exhaust port 39.

As the floating piston 32 reaches the left hand end of its stroke, it pushes outwardly the plunger tappet 53 and the valve 35 immediately is shifted to the left. The pipe 42 leading therefrom now becomes an inlet to the air motor 44, and pipe 43, which was previously the inlet to said air motor, now becomes the compressed air exhaust, and, as a result, the piston 62 in the cylinder 44 is forced to the right, causing the three-way valves 17 to rotate and reverse the action of the measuring chamber. It will readily be perceived that the machine automatically will continue functioning and reversing indefinitely in cycle.

The means (not shown) for placing receptacles under the discharge nozzles 15 and 16 and for removing the receptacles at the proper time when filled is synchronized in its operations with the measuring mechanism heretofore described; an air valve 65 and its associated parts and connections being preferably employed for this purpose in the manner set forth in my previously identified co-pending application.

I claim:

1. In a dispensing apparatus, a measuring vessel provided with ports at its opposite ends, a supply under pressure of fluid to be dispensed, a discharge to a suitable receptacle, valve mechanism for controlling communication between said ports on the one hand and the supply and discharge on the other, and mechanism actuated by pressure of the fluid to control the operation of said valve mechanism to connect each of the ports alternately one with the supply and the other with the discharge.

2. In a dispensing apparatus, a measuring vessel provided with ports at its opposite ends adapted to serve alternately as inlets and outlets to said vessel for a supply of fluid to be dispensed, two discharge nozzles to suitable receptacles, and a separate valve associated with each port for controlling communication between that port, the supply and one of the discharge nozzles.

3. In a dispensing apparatus, a measuring vessel provided with ports at its opposite ends, means operable exteriorly of the vessel to vary the effective capacity of the same, a supply under pressure of fluid to be dispensed, a discharge to a suitable receptacle, valve mechanism disposed between said ports on the one hand and the supply and discharge on the other, and mechanism to operate said valve mechanism to connect each of the ports alternately one with the supply and the other with the discharge, said mechanism automatically actuated upon the completion of each discharging operation.

4. In a dispensing apparatus, a measuring vessel provided with ports at its opposite ends adapted to serve alternately as inlets and outlets to said vessel, a supply under pressure of fluid to be dispensed, a discharge to a suitable receptacle, means for controlling communication between the said ports on the one hand, and the supply and discharge on the other, and mechanism actuated by pressure of the fluid to control the operation of said valve mechanism to connect each of the ports alternately one with the supply and the other with the discharge.

5. In a dispensing apparatus, a closed measuring vessel provided with ports at its opposite ends, a floating piston within the vessel between the ports, a supply under pressure of fluid to be dispensed, a discharge to a suitable receptacle, means to vary the effective capacity of the vessel, valve mechanism disposed between said ports on the one hand and the supply and discharge on the other and arranged to connect each of the ports alternately one with the supply and the other with the discharge, and mechanism actuated by the movement of the piston at the ends of its stroke to operate said valve mechanism.

6. In a dispensing apparatus, a closed measuring vessel provided with ports at its opposite ends, a floating piston within the vessel between the ports, a supply under pressure of fluid to be dispensed, a discharge to a suitable receptacle, means to vary the effective capacity of the vessel comprising an adjustable false head to the vessel at one side of the piston, valve mechanism disposed between said ports on the one hand and the supply and discharge on the other, and mechanism to operate said valve mechanism to connect each of the ports alternately one with the supply and the other with the discharge, said mechanism automatically actuated upon the completion of each discharging operation.

7. In a dispensing apparatus, a closed measuring vessel provided with ports at its opposite ends, a floating piston within the vessel between the ports, a supply under pressure of fluid to be dispensed, a discharge in duplicate to suitable receptacles, a pipe leading from each port to one of the discharges, a manifold connecting the supply with each of said pipes, a three-way valve disposed in each of said pipes in the intersection therewith of the manifold, a connection between the stems of said valves, and mechanism actuated by the movement of the piston to operate said valves in unison whereby to connect each of the ports alternately one with the fluid supply and the other with one of the discharges.

8. In a dispensing apparatus, a closed measuring vessel provided with ports at its opposite ends, a floating piston within the vessel between the ports, a supply under pressure of fluid to be dispensed, a discharge in duplicate to suitable receptacles, a pipe leading from each port to one of the discharges, a manifold connecting the supply with each of said pipes, a three-way valve disposed in each of said pipes in the intersection therewith of the manifold, a connection between the stems of said valves, and mechanism actuated by the movement of the piston to operate said valves in unison whereby to connect each of the ports alternately one with the fluid supply and the other with one of the discharges, and means to regulate the stroke of the piston to vary the quantity of fluid discharged from the vessel with each stroke.

9. In a dispensing apparatus, a closed measuring vessel provided with ports at its opposite ends, a floating piston within the vessel between the ports, a supply under pressure of fluid to be dispensed, a discharge in duplicate to suitable receptacles, a pipe leading from each port to one of the discharges, a manifold connecting the supply with each of said pipes, a three-way valve disposed in each of said pipes at the intersection therewith of the manifold, a connection between the stems of said valves, and mechanism actuated by the movement of the piston to operate said valves in unison whereby to connect each of the ports alternately one with the fluid supply and the other with one of the discharges, said valve operating mechanism comprising, an air motor coupled to the valve stem connection and including a piston and inlet and discharge ports on opposite sides thereof, and means actuated by the movement of the floating piston at the ends of its stroke to connect the inlet and exhaust ports of the motor alternately with a supply of air under pressure.

10. In a dispensing apparatus, a closed measuring vessel provided with ports at its opposite ends, a supply under pressure of fluid to be dispensed, a discharge to a suitable receptacle, valve mechanism disposed between said ports on the one hand and the supply and discharge on the other, means to operate the valve mechanism to connect each of the ports alternately one with the supply and the other with the discharge, and means to vary the effective capacity of the vessel including a micrometer scale for determining such variation.

11. In a dispensing apparatus, a closed measuring vessel provided with ports at its opposite ends, a supply under pressure of fluid to be dispensed, a discharge to a suitable receptacle, valve mechanism disposed between said ports on the one hand and the supply and discharge on the other, means to operate the valve mechanism to connect each of the ports alternately one with the supply and the other with the discharge, means to vary the effective capacity of the vessel comprising a false head disposed therein at one side of the piston, a screw spindle carrying said head, a hand operating wheel on the spindle, the periphery of said wheel graduated, and a scale mounted adjacent the graduated wheel and cooperating therewith to afford a micrometer reading of the variation.

12. In a dispensing apparatus, a closed measuring vessel provided with ports at its opposite ends, a supply under pressure of fluid to be dispensed, a discharge to a suitable receptacle, valve mechanism disposed between said ports on the one hand and the supply and discharge on the other, means to operate the valve mechanism to connect each of the ports alternately one with the supply and the other with the discharge, and means to vary the effective capacity of the vessel including a false head disposed therein at one side of the piston.

In testimony whereof I have hereunto subscribed my name.

BERTIE S. HARRINGTON.